United States Patent
Villareal

(10) Patent No.: US 8,695,141 B1
(45) Date of Patent: Apr. 15, 2014

(54) TIRE UNLOADING RAMP

(71) Applicant: Braulio Villareal, Victorville, CA (US)

(72) Inventor: Braulio Villareal, Victorville, CA (US)

( * ) Notice: Subject to any disclaimer, the term of this patent is extended or adjusted under 35 U.S.C. 154(b) by 0 days.

(21) Appl. No.: 13/942,890

(22) Filed: Jul. 16, 2013

(51) Int. Cl.
*E01D 15/00* (2006.01)

(52) U.S. Cl.
USPC .......................... 14/69.5; 414/537

(58) Field of Classification Search
USPC .......................... 14/69.5; 414/537
See application file for complete search history.

(56) References Cited

U.S. PATENT DOCUMENTS

| | | | |
|---|---|---|---|
| 1,232,437 A * | 7/1917 | Simpson | 14/69.5 |
| 1,855,949 A * | 4/1932 | Dubroca | 254/88 |
| 2,141,529 A * | 12/1938 | Gravelle | 14/69.5 |
| 3,638,910 A | 2/1972 | Nells et al. | |
| 3,818,528 A * | 6/1974 | Petersen | 14/69.5 |
| 4,285,514 A * | 8/1981 | Romero | 472/89 |
| D260,780 S | 9/1981 | Maza et al. | |
| 4,421,300 A | 12/1983 | Lundman | |
| 4,443,905 A * | 4/1984 | Kopp | 14/69.5 |
| 5,026,243 A | 6/1991 | Dell | |
| D401,731 S | 11/1998 | Jeruss | |
| 6,536,064 B1 * | 3/2003 | Swink et al. | 14/69.5 |
| 6,715,177 B1 * | 4/2004 | Lagergren-Julander | 14/69.5 |
| 6,866,464 B2 | 3/2005 | Kellogg et al. | |
| 6,898,815 B2 | 5/2005 | Young | |
| 7,185,381 B1 * | 3/2007 | Heartsill et al. | 14/71.1 |
| 7,810,196 B1 * | 10/2010 | Pritchard et al. | 14/69.5 |
| 2004/0083562 A1 * | 5/2004 | Leblanc | 14/69.5 |
| 2005/0160539 A1 * | 7/2005 | Schomaker et al. | 14/69.5 |
| 2006/0117502 A1 * | 6/2006 | Lensing | 14/69.5 |
| 2006/0150346 A1 * | 7/2006 | Myrick et al. | 14/69.5 |
| 2007/0199166 A1 * | 8/2007 | Peschmann | 14/69.5 |
| 2007/0289073 A1 * | 12/2007 | Williams | 14/69.5 |
| 2009/0255067 A1 * | 10/2009 | Budd et al. | 14/71.1 |

* cited by examiner

*Primary Examiner* — Raymond W Addie
(74) *Attorney, Agent, or Firm* — Kyle A. Fletcher, Esq.

(57) ABSTRACT

The tire-unloading ramp is a specially designed ramp that is ideally suited for rolling a tire away from the ramp when unloading a stack of tires. The tire-unloading ramp includes a back member and a front member that are connected to one another via a hinge member. The front member is longer in length than the back member, and forms an acute angle with respect to the ground surface. Moreover, the hinge member enables an acute angle to form between the front member and the back member, and is located at an apex of the tire-unloading ramp. A support member is able to rotate from against a rear surface of the front member, and engage a support member notch located on a rear surface of the back member.

8 Claims, 4 Drawing Sheets

TIRE UNLOADING RAMP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of portable ramps, more specifically, a ramp that sets up and is used to unload tires from a stack as needed.

Tires can be transported in bulk on a tractor-trailer, and in so doing typically involve stacks of tires. In this situation it may be a task to individually unload each and every tire on a one-at-a-time basis. What is needed is a ramp that is particularly suited for use in aiding an end user in unloading stacks of tires from within a tractor-trailer or elsewhere.

The device of the application at bar seeks to address this need by providing a highly portable ramp that is easy to erect, and aids an end user in unloading tires from a stack.

B. Discussion of the Prior Art

As will be discussed immediately below, no prior art unloading a stack of tires wherein the tire-unloading ramp includes a back member and a front member that are connected to one another via a hinge member; wherein the front member is longer in length than the back member; wherein the hinge member enables an acute angle to form between the front member and the back member, and is located at an apex of the tire-unloading ramp; wherein the front member includes an outer surface that is adorned with rubber traction members that are parallel with one another, and are oriented at an angle; wherein the front member is configured for use with a tire such that said tire is able to be rolled down the front member; wherein the rubber traction members ensure adequate traction between the tires and the front member; wherein the front member includes a kicker plate at a distal end, which is opposite of the hinge member; wherein the back member includes a handle on a distal end of the back member opposite of the hinge member; wherein a support member is able to rotate from against a rear surface of the front member, and engage a support member notch located on a rear surface of the back member; wherein the support member acts to stabilize and lock the hinge member in place when the tire-unloading ramp is erected for use.

The Young Patent (U.S. Pat. No. 6,898,815) discloses a portable unloading dock. However, the unloading dock is not a ramp that erects itself to enable a tire to be rolled away there from.

The Kellogg et al. Patent (U.S. Pat. No. 6,866,464) discloses a folding cargo loading/unloading ramp. However, the folding ramp is not constructed of a front member and a rear member in order to erect itself, and support itself upright, and onto which a tire is to be rolled down from.

The Dell Patent (U.S. Pat. No. 5,026,243) discloses a portable unloading platform and ramp. However, the platform and ramp includes a platform surface that is level, and which is configured for use adjacent with a side door to a tractor trailer.

The Swink et al. Patent (U.S. Pat. No. 6,536,064) discloses a folding ramp with pivotal leg support. However, the folding ramp relies on leaning against a surface, and does not self-support.

The Lundman Patent (U.S. Pat. No. 4,421,300) discloses a vehicle ramp. However, the vehicle rempa does not form an apex at which a hinge member is provided so as to enable folding up of a front member with respect to a rear member.

The Nellis et al. Patent (U.S. Pat. No. 3,638,910) discloses a car wheel support. However, the support is not a ramp used to unload tires from a stack, but is directed to lifting a vehicle off of the ground.

The Jeruss Patent (U.S. Pat. No. Des. 401,731) illustrates an ornamental design for a ramp for loading and unloading trucks, which does not fold flat when not in use.

The Maza et al. Patent (U.S. Pat. No. Des. 260,780) illustrates an ornamental design for a self-standing floor sign, which is not able to pivot in order to form an acute angle between the ground surface and the front member such that a tire is to be rolled down there from.

While the above-described devices fulfill their respective and particular objects and requirements, they do not describe a tire-unloading ramp that is configured for use in unloading a stack of tires wherein the tire-unloading ramp includes a back member and a front member that are connected to one another via a hinge member; wherein the front member is longer in length than the back member; wherein the hinge member enables an acute angle to form between the front member and the back member, and is located at an apex of the tire-unloading ramp; wherein the front member includes an outer surface that is adorned with rubber traction members that are parallel with one another, and are oriented at an angle; wherein the front member is configured for use with a tire such that said tire is able to be rolled down the front member; wherein the rubber traction members ensure adequate traction between the tires and the front member; wherein the front member includes a kicker plate at a distal end, which is opposite of the hinge member; wherein the back member includes a handle on a distal end of the back member opposite of the hinge member; wherein a support member is able to rotate from against a rear surface of the front member, and engage a support member notch located on a rear surface of the back member; wherein the support member acts to stabilize and lock the hinge member in place when the tire-unloading ramp is erected for use. In this regard, the tire-unloading ramp departs from the conventional concepts and designs of the prior art.

SUMMARY OF THE INVENTION

The tire-unloading ramp is a specially designed ramp that is ideally suited for rolling a tire away from the ramp when unloading a stack of tires. The tire-unloading ramp includes a back member and a front member that are connected to one another via a hinge member. The front member is longer in length than the back member, and forms an acute angle with respect to the ground surface. Moreover, the hinge member enables an acute angle to form between the front member and the back member, and is located at an apex of the tire-unloading ramp. The front member includes an outer surface that is adorned with rubber traction members that are parallel with one another, and are oriented at an angle. The front member is configured for use with a tire such that said tire is rolled down the front member. The rubber traction members ensure adequate traction between the tires and the front member. The front member includes a kicker plate at a distal end, which is opposite of the hinge member. The back member includes a handle on a distal end of the back member opposite of the hinge member. A support member is able to rotate from against a rear surface of the front member, and engage a support member notch located on a rear surface of the back member. The support member acts to stabilize and lock the hinge member in place when the tire-unloading ramp is erected for use.

It is an object of the invention to provide a ramp that is easy to erect, and which aids an end user in unloading a stack of tires by enabling each tire to be rolled down the ramp and away from the end user and stack of tires.

A further object of the invention is to provide a tire-unloading ramp that forms an acute angle between the front of the tire-unloading ramp and the ground surface in order to efficiently roll the un-stacked tire down the ramp, and onto the ground surface.

A further object of the invention is to provide a front member with rubber traction members on a front surface to aid in providing traction to the un-stacked tire upon rolling down the tire-unloading ramp.

These together with additional objects, features and advantages of the tire-unloading ramp will be readily apparent to those of ordinary skill in the art upon reading the following detailed description of presently preferred, but nonetheless illustrative, embodiments of the tire-unloading ramp when taken in conjunction with the accompanying drawings.

In this respect, before explaining the current embodiments of the tire-unloading ramp in detail, it is to be understood that the tire-unloading ramp is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tire-unloading ramp.

It is therefore important that the claims be regarded as including such equivalent construction insofar as they do not depart from the spirit and scope of the tire-unloading ramp. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
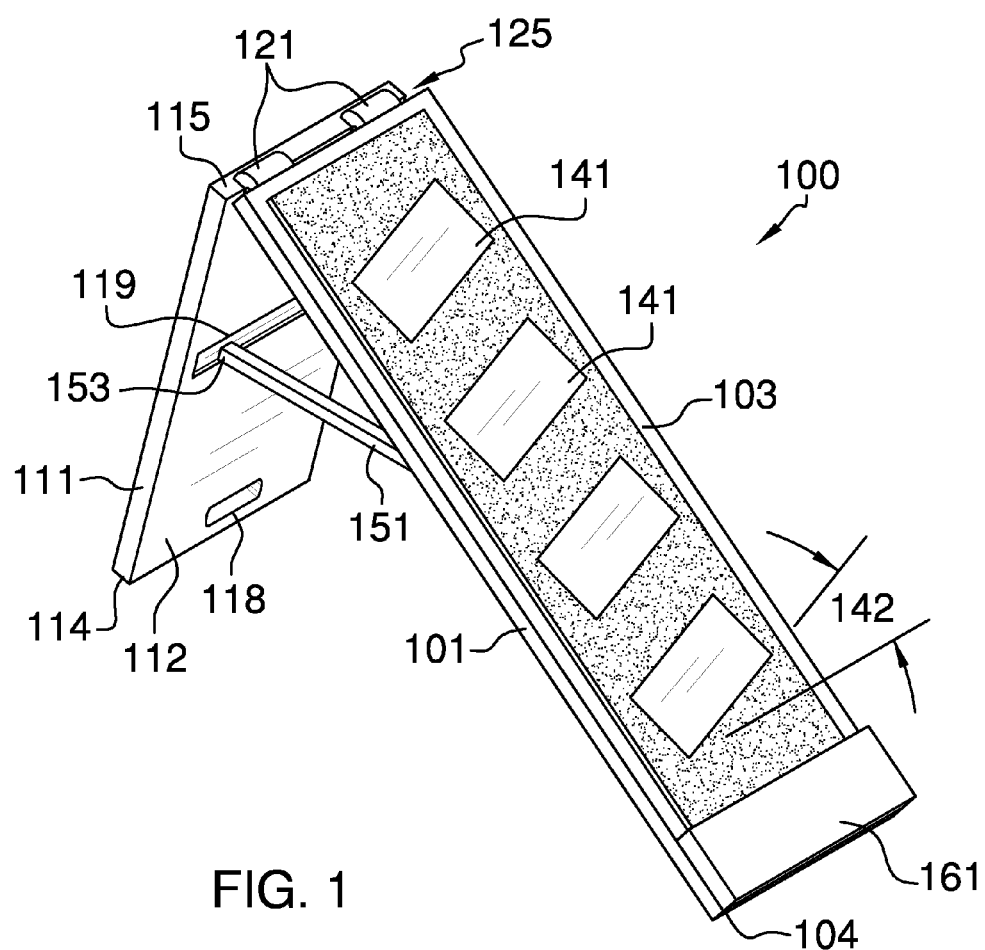
FIG. 1 illustrates a perspective view of the tire-unloading ramp by itself.
Figure 2:
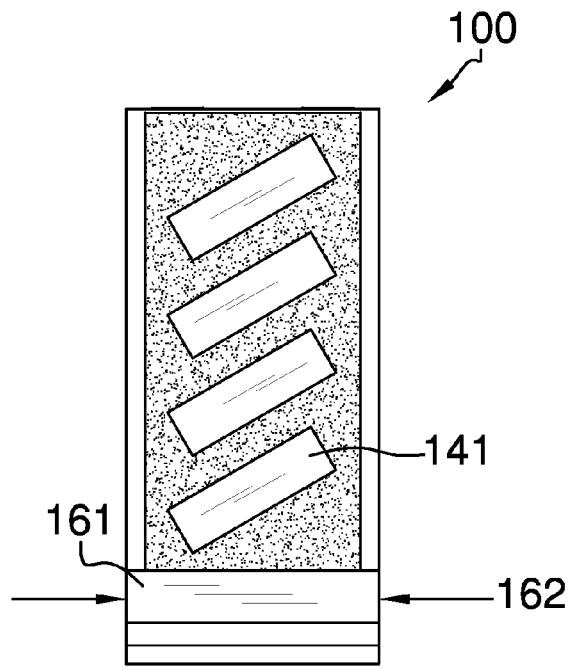
FIG. 2 illustrates a front view of the tire-unloading ramp by itself.
Figure 3:
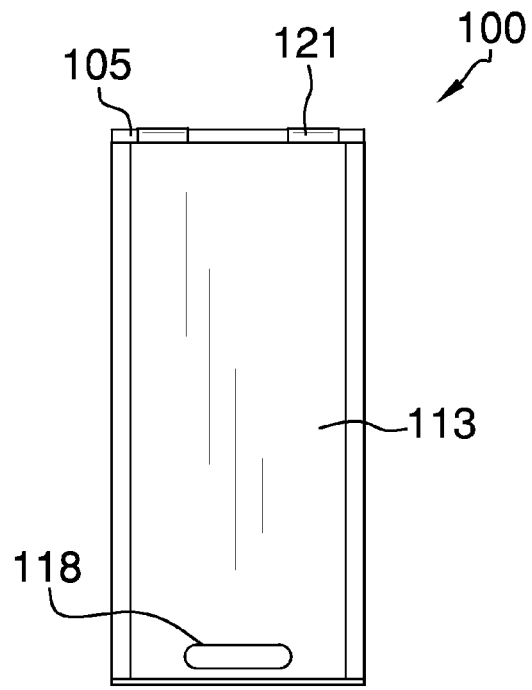
FIG. 3 illustrates a back view of the tire-unloading ramp by itself.
Figure 4:
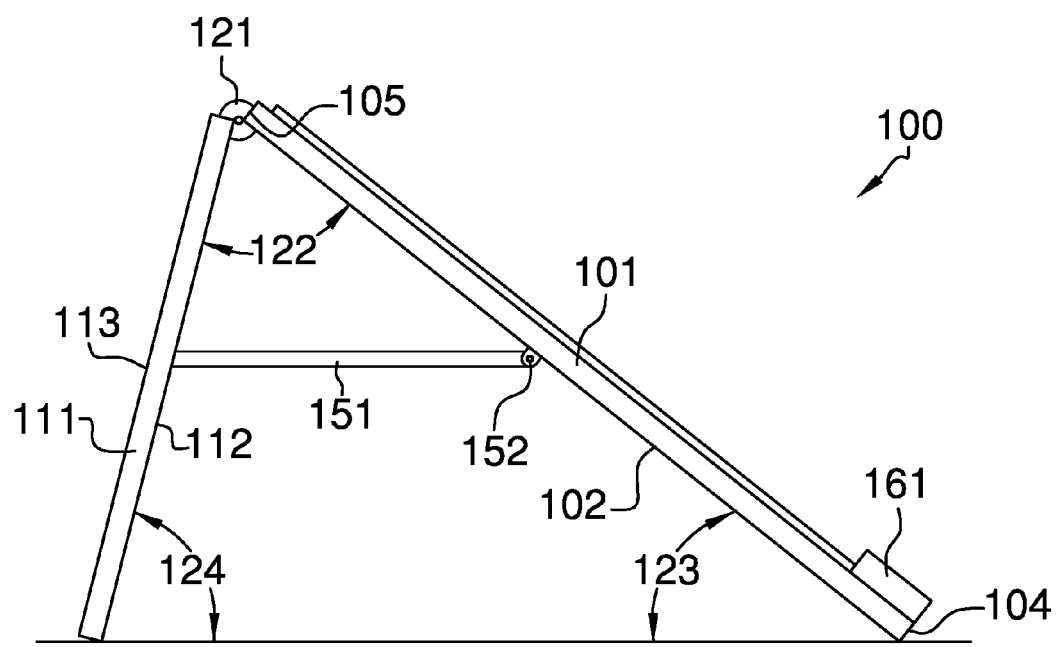
FIG. 4 illustrates a side view of the tire-unloading ramp by itself.
Figure 5:
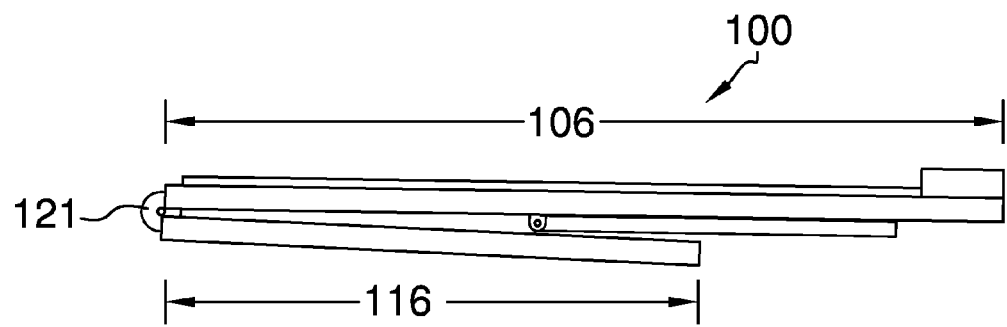
FIG. 5 illustrates a closed view of the tire-unloading ramp.
Figure 6:
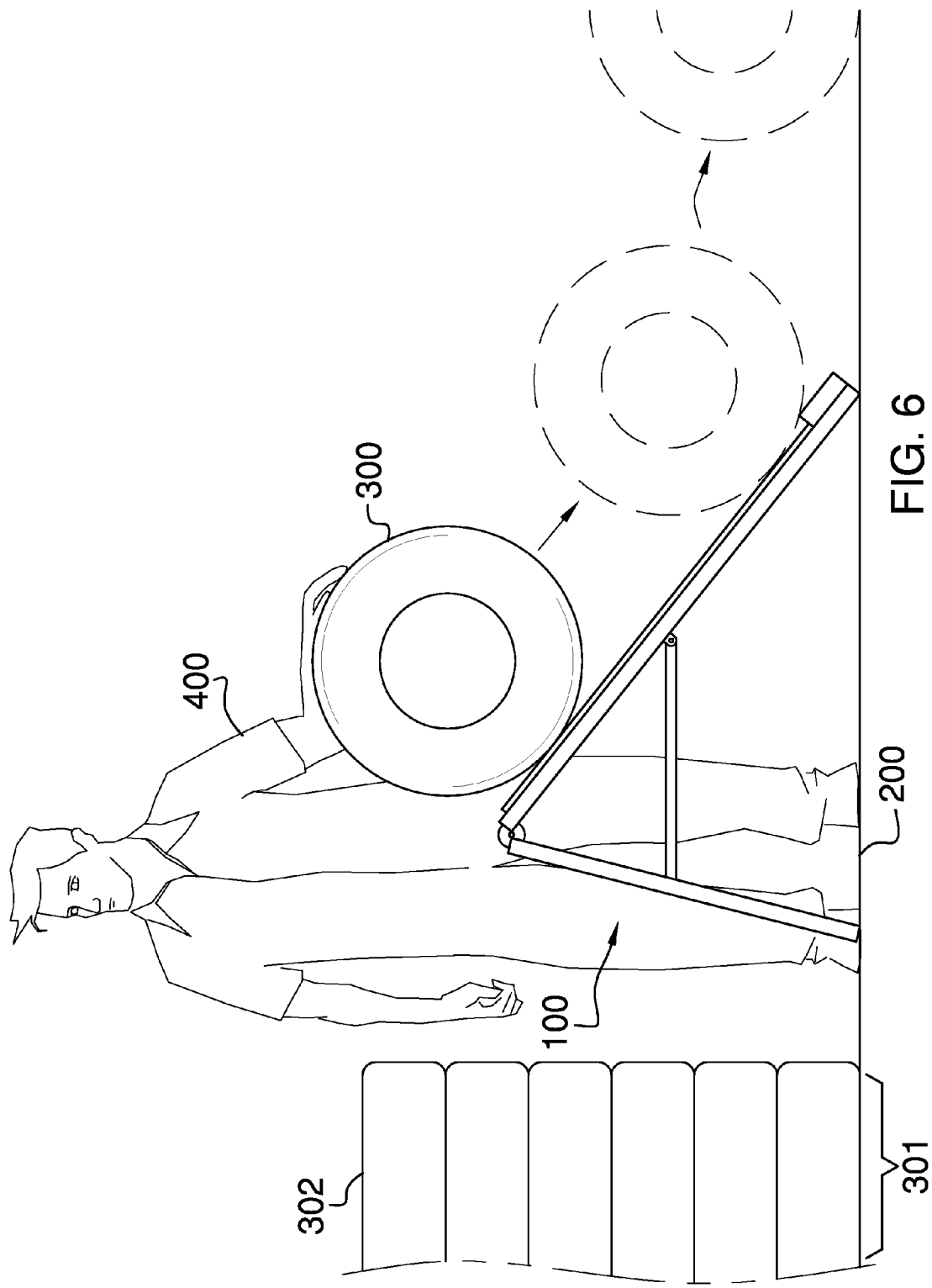
FIG. 6 illustrates a side view of the tire-unloading ramp in use.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A tire-unloading ramp 100 (hereinafter invention) is further defined with a front member 101 and a back member 111. The front member 101 is further defined with a front inner surface 102 and a front outer surface 103. The front member 101 is further defined with a first front distal end 104 and a second front distal end 105 forming a front length 106. The front member 101, like the back member 111, is a generally planar object.

The back member 111 is further defined with a back inner surface 112 and a back outer surface 113. The back member 111 is further defined with a first back distal end 114 and a second back distal end 115 forming a back length 116. The front length 106 of the front member 101 is greater than the back length 116 of the back member 111.

A hinge member 121 is included with the invention 100 and connects the front member 101 to the back member 111. Moreover, the hinge member 121 connects to the second back distal end 115 of the back member 111 as well as to the second front distal end 105 of the front member 101. The hinge member 121 enables the front member 101 and the back member 121 to form a member acute angle 122 there between. Moreover, due to the relative lengths of the front length 106 and the back length 116, the front member 101 forms a front acute angle 123 with respect to a ground surface 200 whereas the back member 111 forms a back obtuse angle 124 with respect to the ground surface 200. Upon erecting the invention 100 as depicted in FIG. 1, the hinge members 121 are located at an apex 125.

The front outer surface 103 includes a plurality of traction members 141 thereon. The traction members 141 may be made of rubber, and are oriented at a traction member angle 142 along the front outer surface 103. Moreover, the traction members 141 are generally parallel with one another, and are equally spaced along the front length 106.

The back member 111 includes a handle 118 located adjacent the first back distal end 114. The handle 118 is essentially an oblong cutout from the back member 111 that provides a place with which to grasp the back member 111 when erecting or collapsing the invention 100. The front inner surface 102 includes a support member 151 that is connected via a support hinge 152. The support member 151 rotates out, and is further defined with a support distal end 153 that engages a support notch 119 located on the back inner surface 112 of the back member 111. The support member 151 supports the invention 100 when erected such that the invention 100 does not collapse when in use.

The front member 101 includes a kicker plate 161 that is positioned adjacent the first front distal end 104. The kicker plate 161 provides a step that when a tire 300 is being rolled down the front outer surface 103 shall cause the tire 300 to bounce before exiting the invention 100. The kicker plate 161 has a width 162 equal with that of the front member 101 and the back member 111. The invention 100 is designed to enable an end user 400 to easily unload a stack of tires 301 by removing a topmost tire 302, and rolling said topmost tire 302 down the front member 101.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

I claim:

1. A tire-unloading ramp comprising:
   a front member and a back member;
   wherein the front member includes a front outer surface configured to enable a tire to be rolled down said front member thereby aiding in unloading a stack of tires;
   wherein the back member is not configured to enable a tire to be rolled down said rear member;
   wherein the front member is further defined with a front inner surface and the front outer surface; wherein the front member is further defined with a first front distal end and a second front distal end forming a front length;
   wherein the back member is further defined with a back inner surface and a back outer surface; wherein the back member is further defined with a first back distal end and a second back distal end forming a back length; wherein the front length of the front member is greater than the back length of the back member;
   wherein the front member and the back member are generally planar objects; wherein a hinge member is included and connects the front member to the back member; wherein the hinge member connects to the second back distal end of the back member as well as to the second front distal end of the front member; wherein the hinge member enables the front member and the back member to form a member acute angle there between;
   wherein the front member forms a front acute angle with respect to a ground surface whereas the back member forms a back obtuse angle with respect to the ground surface; wherein the hinge member is located at an apex;
   wherein the front outer surface includes a plurality of traction members thereon; wherein the traction members are oriented at a traction member angle along the front outer surface; wherein the traction members are generally parallel with one another, and are equally spaced along the front length;

2. The tire-unloading ramp as described in claim 1 wherein the back member includes a handle located adjacent the first back distal end; wherein the handle is essentially an oblong cutout from the back member that provides a place with which to grasp the back member when erecting or collapsing the tire-unloading ramp.

3. The tire-unloading ramp as described in claim 2 wherein the front inner surface includes a support member that is connected via a support hinge; wherein the support member rotates out, and is further defined with a support distal end that engages a support notch located on the back inner surface of the back member.

4. The tire-unloading ramp as described in claim 3 wherein the front member includes a kicker plate that is positioned adjacent the first front distal end; wherein the kicker plate provides a step that when the tire is being rolled down the front outer surface causes the tire to bounce before exiting the front member.

5. The tire-unloading ramp as described in claim 4 wherein the kicker plate has a width equal with that of the front member and the back member.

6. A tire-unloading ramp comprising:
   a front member and a back member;
   wherein the front member includes a front outer surface configured to enable a tire to be rolled down said front member thereby aiding in unloading a stack of tires;
   wherein the back member is not configured to enable a tire to be rolled down said rear member;
   wherein the front member is further defined with a front inner surface and the front outer surface; wherein the front member is further defined with a first front distal end and a second front distal end forming a front length;
   wherein the back member is further defined with a back inner surface and a back outer surface; wherein the back member is further defined with a first back distal end and a second back distal end forming a back length; wherein the front length of the front member is greater than the back length of the back member;
   wherein the front member and the back member are generally planar objects; wherein a hinge member is included and connects the front member to the back member; wherein the hinge member connects to the second back distal end of the back member as well as to the second front distal end of the front member; wherein the hinge member enables the front member and the back member to form a member acute angle there between;
   wherein the front member forms a front acute angle with respect to a ground surface whereas the back member forms a back obtuse angle with respect to the ground surface; wherein the hinge member is located at an apex;
   wherein the front outer surface includes a plurality of traction members thereon; wherein the traction members are oriented at a traction member angle along the front outer surface; wherein the traction members are generally parallel with one another, and are equally spaced along the front length;
   wherein the back member includes a handle located adjacent the first back distal end; wherein the handle is essentially an oblong cutout from the back member that provides a place with which to grasp the back member when erecting or collapsing the tire-unloading ramp;
   wherein the front inner surface includes a support member that is connected via a support hinge; wherein the support member rotates out, and is further defined with a support distal end that engages a support notch located on the back inner surface of the back member.

7. The tire-unloading ramp as described in claim 6 wherein the front member includes a kicker plate that is positioned adjacent the first front distal end; wherein the kicker plate provides a step that when the tire is being rolled down the front outer surface causes the tire to bounce before exiting the front member.

8. The tire-unloading ramp as described in claim 7 wherein the kicker plate has a width equal with that of the front member and the back member.

\* \* \* \* \*